United States Patent [19]
Jurik et al.

[11] Patent Number: 5,609,423
[45] Date of Patent: Mar. 11, 1997

[54] LOWER BEARING ASSEMBLY INCLUDING BEARING WEDGE

[75] Inventors: Mirjana Jurik; Thomas Dziegielewski, both of Rochester Hills; Thomas Grzybowski, Fraser, all of Mich.

[73] Assignee: Chrysler Corporation, Auburn Hills, Mich.

[21] Appl. No.: 668,798

[22] Filed: Jun. 24, 1996

[51] Int. Cl.⁶ ............................. F16C 33/58; B62D 1/18
[52] U.S. Cl. ......................... 384/518; 384/538; 74/493
[58] Field of Search ............................ 384/518, 517, 384/538; 74/492, 493, 484 R

[56] References Cited

U.S. PATENT DOCUMENTS

| | | | |
|---|---|---|---|
| 2,164,497 | 7/1939 | Chamberlin | 384/518 |
| 2,232,473 | 2/1941 | Pulleyblank | 384/518 |
| 2,509,587 | 5/1950 | Creson | 384/518 |
| 3,747,426 | 7/1973 | Schluckebier | 74/492 |
| 5,417,614 | 5/1995 | Dykema et al. | 74/492 X |
| 5,531,526 | 7/1996 | Labedan et al. | 384/518 |

*Primary Examiner*—Thomas R. Hannon
*Attorney, Agent, or Firm*—Edward A. Craig

[57] ABSTRACT

A lower bearing assembly for supporting a steering shaft within a tubular jacket of an automotive steering column. The steering shaft is of double-D configuration having two diametrically opposite, arcuate side walls and two diametrically opposite parallel flats. A cup is fitted within the jacket having a hole in the bottom wall through which the steering shaft extends. A bearing within the cup supports the steering shaft for rotation. A wedge is sleeved on the steering shaft and has a tapered nose wedged between the bearing and the steering shaft. The wedge has an inner double-D configuration matching that of the steering shaft. A compression coil spring encircles the wedge and bears on a flange on the wedge to hold the nose of the wedge wedged tightly between the bearing and the steering shaft. A retaining ring is sleeved on the steering shaft and holds the spring under compression. The inner edge of the retaining ring has the same double-D configuration as the steering shaft.

4 Claims, 3 Drawing Sheets

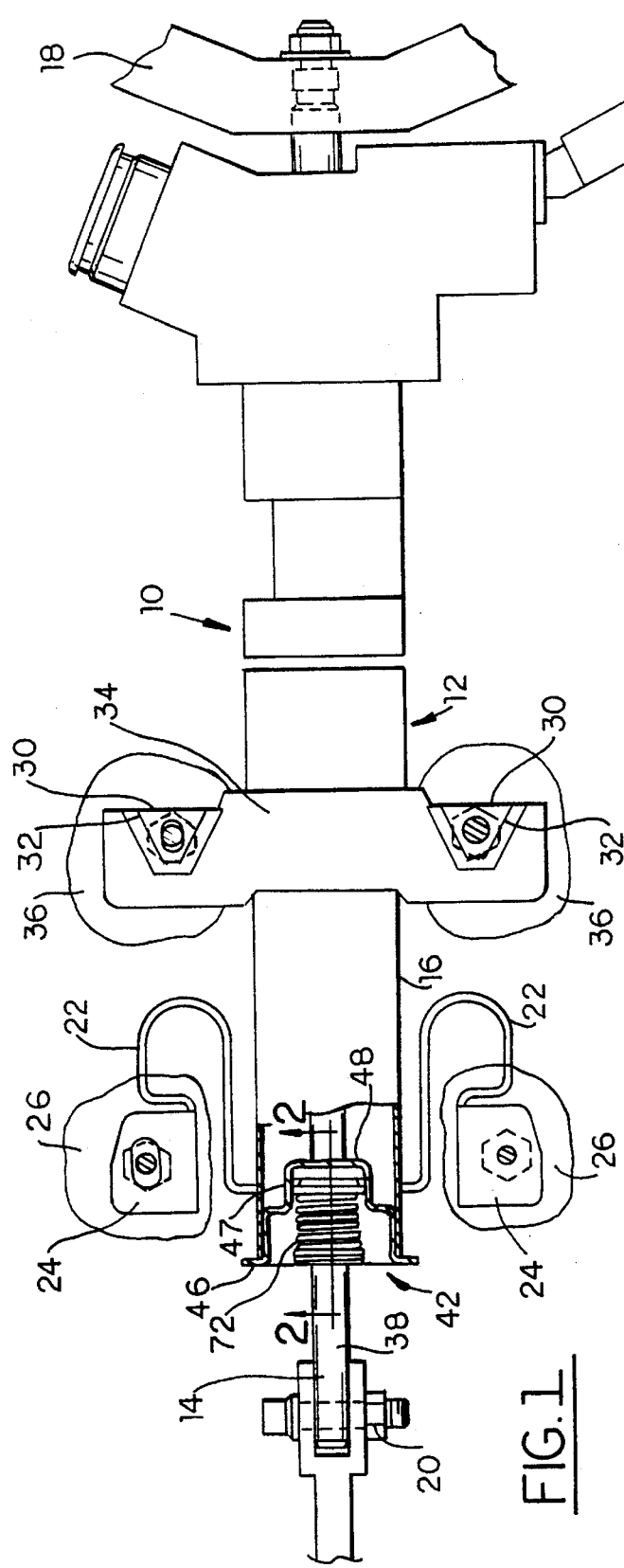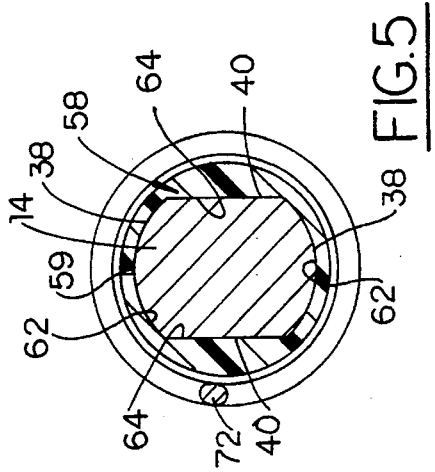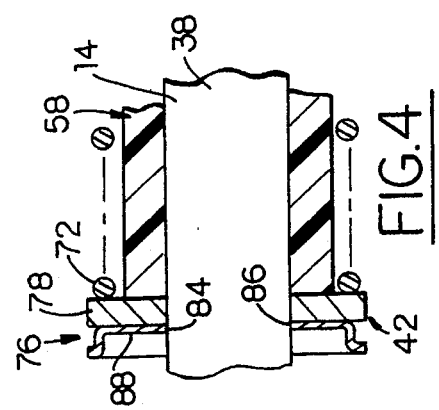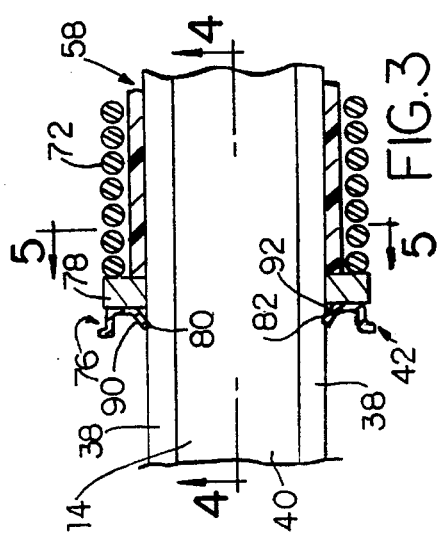

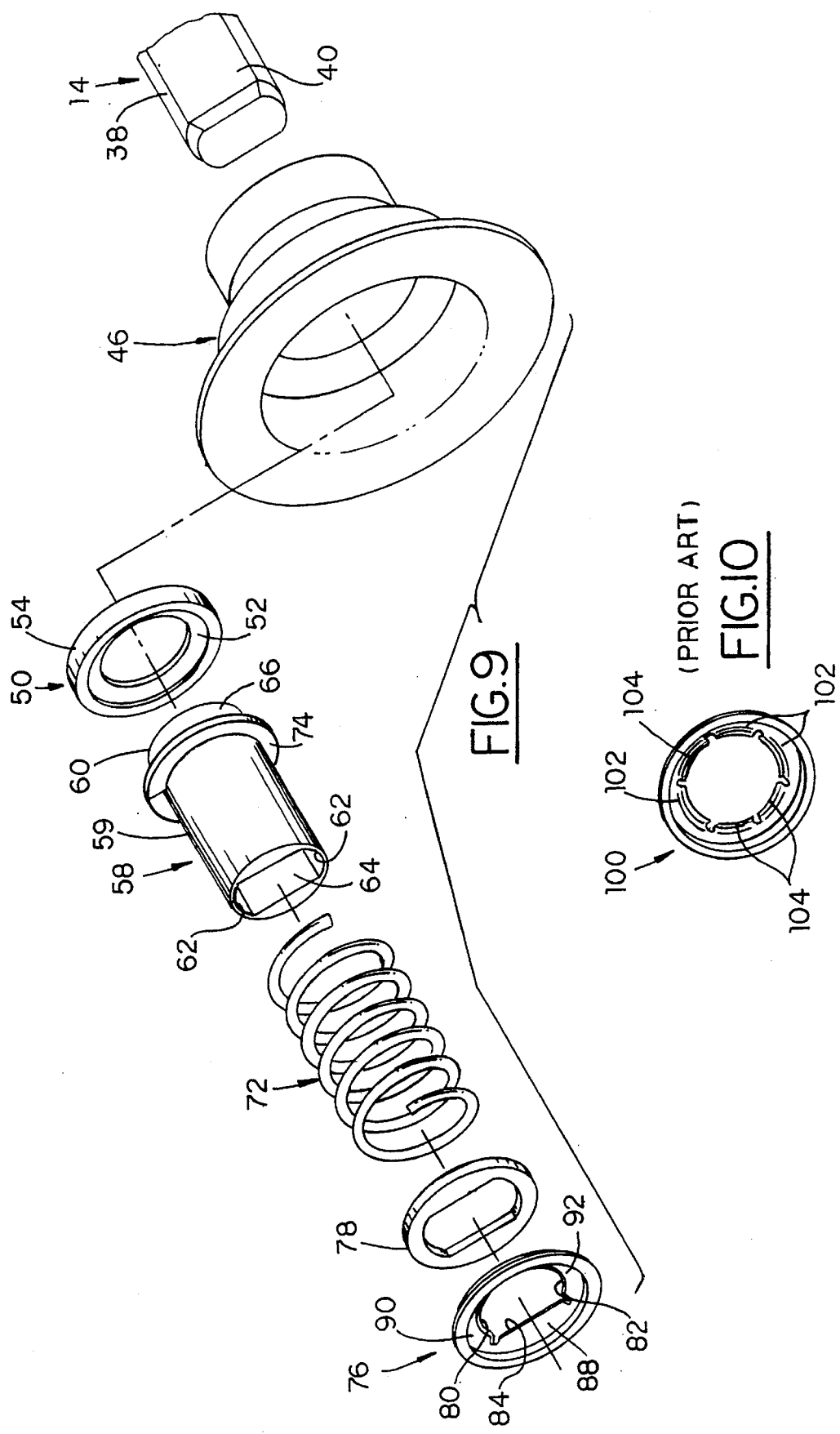

5,609,423

LOWER BEARING ASSEMBLY INCLUDING BEARING WEDGE

FIELD OF INVENTION

This invention relates generally to steering column assemblies for motor vehicles and more particularly to a lower bearing assembly including a wedge for the bearing of a double-D steering shaft.

BACKGROUND AND SUMMARY OF THE INVENTION

In a steering column of an automotive vehicle, a lower bearing assembly supports the steering shaft for rotation. In the case of cylindrical steering shafts, a spring is provided to keep the load on the bearing.

The present invention applies to a so-called double-D steering shaft which has two diametrically opposite, arcuate sides, and two diametrically opposite flats between the arcuate sides. In accordance with a preferred embodiment of the invention, the steering shaft extends through a cup in the jacket surrounding the steering shaft and an annular bearing sleeved on the steering shaft at the base of the cup supports the steering shaft for rotation. The bearing is held seated in the base of the cup by a wedge sleeved on the steering shaft having a tapered nose or wedge which is wedged between the bearing and the steering shaft. The wedge has an internal double-D configuration matching that of the steering shaft. A compression coil spring encircling the wedge bears against a flange on the wedge to hold the nose of the wedge wedged tightly between the bearing and the steering shaft. A retaining ring is sleeved on the steering shaft and holds the spring under compression. The construction also preferably includes a spacer between the wedge and the retaining ring, the retaining ring bearing against the spacer and the spacer bearing against the spring.

Further in accordance with the invention, the retaining ring preferably has an inner configuration which matches that of the double-D steering shaft. It is formed with two diametrically opposite, arcuate side edges to frictionally engage the arcuate side walls of the steering shaft. The retaining ring is also formed with two diametrically opposite, parallel, straight edges which frictionally engage the two flat sides of the steering shaft. Preferably, the retaining ring has an annular base formed with two diametrically opposite, arcuate flanges bent to an acute angle relative to the base and terminating in the arcuate side edges which engage the curved sides of the steering shaft. The base is otherwise flat between the flanges and terminates in the straight edges which engage the flat sides of the steering shaft.

One object of this invention is to provide a lower bearing assembly having the foregoing features and capabilities.

Another object is to provide a lower bearing assembly which is rugged and durable in use and capable of being readily and inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 1 is a plan view with parts broken away and in section, of a steering column and lower bearing assembly constructed in accordance with the invention.

FIG. 3 is a further enlargement of a portion of FIG. 2.

FIG. 4 is a sectional view taken on the line 4—4 in FIG. 3.

FIG. 5 is a sectional view taken on the line 5—5 in FIG. 3.

FIG. 9 is an exploded view in perspective showing the parts of the lower bearing assembly.

FIG. 10 is a perspective view of a prior art retaining ring.

DETAILED DESCRIPTION OF THE PREFERRED EMBODIMENT

Figure 2:
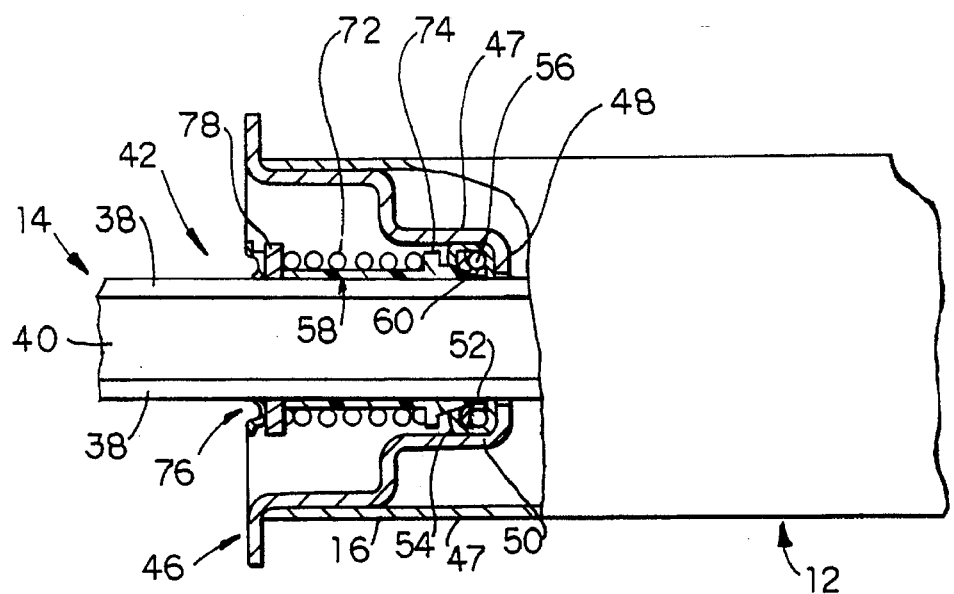
FIG. 2 is an enlarged view partly in section and partly in elevation of a portion of the structure of FIG. 1, the part in section being taken on the line 2—2 in FIG. 1.

Referring now more particularly to the drawing, a steering column assembly 10 is shown comprising an elongated downwardly and forwardly inclined steering column 12 having an elongated steering shaft 14 extending lengthwise within an elongated tubular jacket 16. A steering wheel 18 is mounted on the upper end of the steering shaft. A shaft coupler 20 on the lower end of the steering shaft is operatively connected to a steering gear assembly (not shown) to steer the front wheels of an automotive vehicle.

Resilient spring-like straps 22 attached at one end to brackets 24 which are in turn mounted on rigid vehicle support structure 26, are connected at their opposite ends to the jacket 16 of the steering column and are provided to absorb energy in the event of a frontal impact resulting in collapse of the steering column when the driver is thrown forward against the steering wheel. Vibration is suppressed by quick release capsules 30 mounted in grooves 32 of bracket 34 on opposite sides of the steering column, the brackets being secured to vehicle support structure 36. These capsules are capable of quickly releasing so as not to interfere with the collapse of the steering column.

The steering shaft 14, throughout its length, is of a uniform double-D configuration, having two diametrically opposite sides 38 curved to the same radius, and two parallel, diametrically opposite, flat or planar surfaces 40, sometimes referred to hereinafter as flats, between the arcuately curved sides 38.

A lower bearing assembly 42 supports the steering shaft 14 for axial rotation. The lower bearing assembly comprises a cup 46 which is secured in the lower end of the jacket 16 by having its side wall 47 press fitted in and/or welded or otherwise secured to the jacket. The cup opens in a direction facing the coupler 20 and has a hole in its bottom wall 48 through which the steering shaft extends. The hole is large enough to clear the steering shaft and allow it to rotate freely.

An annular bearing 50 is seated in the cup 46 against the bottom wall 48. The bearing has inner and outer ring-shaped races 52 and 54 surrounding the steering shaft which are arcuate in cross-section and contain a series of balls 56 therebetween.

A wedge 58 is sleeved on the shaft within the cup and has a tapered nose or wedge 60 at the end adjacent to the bearing. The wedge is formed of any suitable material, preferably plastic, such, for example, as urethane. The inner configuration of the wedge 58 is like that of the steering shaft, that is, it has the diametrically opposite arcuately curved sides 62 and also the diametrically opposite flats 64 (FIGS. 5 and 9). The wedge 58 closely envelops the steering shaft so that it rotates with the steering shaft but can slide lengthwise along the steering shaft. The wedge 58 may be transversely split where indicated at 59 so that it can be expanded slightly when fitted on the steering shaft and to facilitate axial sliding movement thereof.

The nose 60 of the wedge is tapered by having its frusto-conical radially outer surface 66 inclined or tapered toward its radially inner surface. The tapered nose is wedged between the inner race 52 of the bearing and the steering shaft and presses the outer race 54 of the bearing against the inner side wall 47 and bottom wall 48 of the cup.

Figure 6:
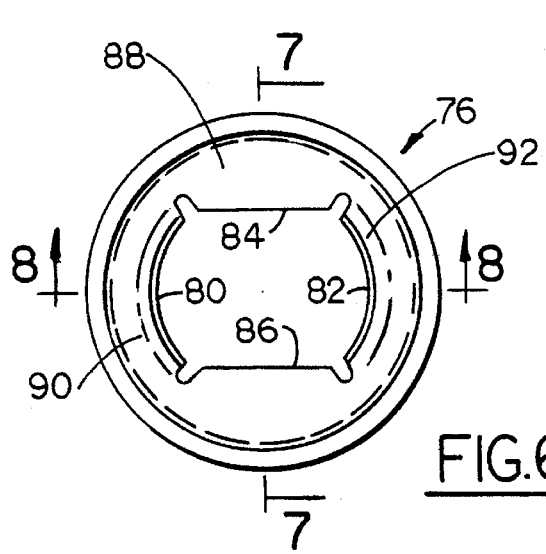
FIG. 6 is an elevational view of the retaining ring which is part of the lower bearing assembly.
Figure 7:
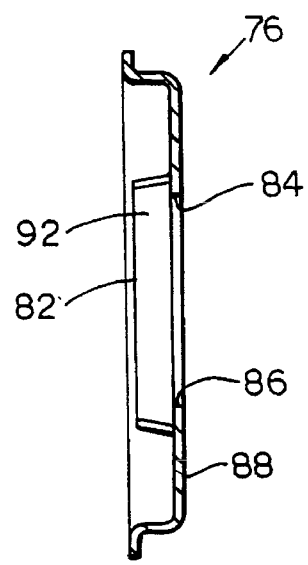
FIG. 7 is a sectional view taken on the line 7—7 in FIG. 6.
Figure 8:
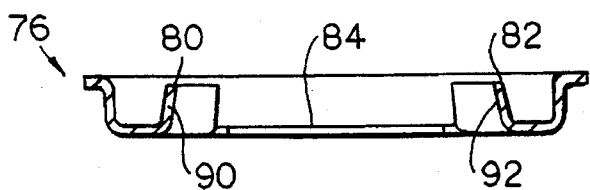
FIG. 8 is a sectional view taken on the line 8—8 in FIG. 6.

A compression coil spring 72 encircles the wedge 58. One end of the spring bears against a radially outwardly extending annular flange 74 on the wedge adjacent the nose 60. A retaining ring 76 (FIGS. 6–8) is sleeved on the steering shaft adjacent the opposite end of the spring, and a spacer 78 is sleeved on the steering shaft between the spring 72 and the retaining ring 76.

The retaining ring 76 has a radially inner double-D configuration of substantially the same size and shape as the steering shaft. It is formed with two diametrically opposite, arcuate side edges 80 and 82 of the same radius of curvature and spaced approximately the same distance apart as the arcuate side walls 38 of the steering shaft to frictionally engage the arcuate side walls. The inner configuration of the retaining ring also has two diametrically opposite, parallel, straight edges 84 and 86 spaced approximately the same distance apart as the flats 40 of the steering shaft to frictionally engage the flats 40. More specifically, the base 88 of the retaining ring is formed with two diametrically opposite, arcuate flanges 90 and 92 which are bent to an acute angle relative to the base in a direction away from the coil spring 72, terminating in the arcuate side edges 80 and 82. Between the flanges 90 and 92, the base is flat and terminates in the straight edges 84 and 86.

The inner edge of the spacer 78 is of the same double-D configuration as the steering shaft and is slidably sleeved on the steering shaft.

The lower bearing assembly is put together by first installing the cup 46 in the jacket 16 and with the steering shaft extending through the hole in the bottom wall of the cup, after which the bearing 50 is placed around the steering shaft and seated against the bottom wall of the cup. Then the wedge 58 is slid onto the steering shaft and its nose 60 wedged between the inner race 52 of the bearing and the steering shaft. The spring is next installed around the wedge, after which the spacer 78 and retaining ring 76 are sleeved on the end of the steering shaft. The flanges 90 and 92 of the retaining ring are sufficiently flexible to provide a guide for the sleeving of the retaining ring on the steering shaft and preventing reverse sliding movement of the retaining ring because of the frictional locking action of the edges 80 and 82 of the flanges 90 and 92 on the side walls 38 of the steering shaft. The retaining ring is pressed up tight against the spacer 78 so that the spacer compresses the coil spring 72 and presses the nose 60 of the wedge 46 into a more tightly wedged relationship between the bearing 50 and the steering shaft. The spacer 78 also contacts the end of the wedge 58.

The retaining ring is also held against reverse movement by the frictional locking engagement of the straight edges 84 and 86 with the flats 40 of the steering shaft. The edges 84 and 86 are on a flat portion of the base, rather than on acute angle flanges, and have a powerful locking action on the steering shaft. The edges 80, 82, 84 and 86 actually bite into the surfaces 38 and 40 of the steering shaft to prevent the retaining ring from reverse movement away from the spring 72. The retaining ring 76 thus holds the lower bearing assembly tightly on the steering shaft without any noise or vibration.

The flange 74 on the wedge 58 transmits the spring load evenly around the bearing. The end of the wedge opposite the nose 60 provides a stop for the retaining ring 76 and spacer 78 and is of a length to control the desired working length of the spring and to maintain the spring load parallel to the steering shaft.

FIG. 9 is a view of a prior art retaining ring 100 which has a series of arcuate, acute angle flanges 102 having inner edges 104 for gripping a cylindrical steering shaft, that is, one of circular cross-section.

What is claimed is:

1. A lower bearing assembly for supporting a steering shaft within a tubular jacket of an automotive steering column wherein the steering shaft is of double-D configuration having two diametrically opposite, arcuate side walls formed with the same radius of curvature and two diametrically opposite, parallel flats between said side walls, comprising:

a cup fitted within the jacket having a bottom wall formed with a hole through which the steering shaft extends, an annular bearing within said cup sleeved on the steering shaft and supporting the steering shaft for rotation, means holding said bearing seated on the bottom wall of the cup comprising a wedge sleeved on the steering shaft, said wedge having an inner double-D configuration matching that of the steering shaft and having an end provided with a tapered nose wedged between said bearing and said steering shaft, and a spring bearing on said wedge to hold the nose of said wedge wedged tightly between said bearing and said steering shaft.

2. A lower bearing assembly as defined in claim 1, wherein said wedge has an annular, radially outwardly extending flange adjacent said tapered nose, said spring is a compression coil spring encircling said wedge and bearing on said flange, and further comprising a retaining ring sleeved on said steering shaft and holding the spring under compression, said flange transmitting the spring load evenly around the bearing.

3. A lower bearing assembly as defined in claim 2, wherein said wedge has a second end remote from said nose, and further comprising a spacer ring sleeved on the steering shaft between said second end of the wedge and said retainer ring, said retaining ring bearing against said spacer ring and said spacer ring bearing against said second end of said wedge and said spring, said wedge thereby providing a stop for said retaining ring and spacer ring and being of a length to control the desired working length of the spring and to maintain the spring load parallel to the steering shaft.

4. A lower bearing assembly as defined in claim 3, wherein said wedge is transversely split permitting said wedge to be axially slidable on said steering shaft and facilitating fitting said wedge on said steering shaft.

* * * * *